(12) United States Patent
Chellamani et al.

(10) Patent No.: US 10,470,154 B2
(45) Date of Patent: Nov. 5, 2019

(54) METHODS, SYSTEMS, AND COMPUTER READABLE MEDIA FOR VALIDATING SUBSCRIBER LOCATION INFORMATION

(71) Applicant: Oracle International Corporation, Redwood Shores, CA (US)

(72) Inventors: Ramesh Chellamani, Cary, NC (US); Devesh Agarwal, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/376,631

(22) Filed: Dec. 12, 2016

(65) Prior Publication Data

US 2018/0167906 A1    Jun. 14, 2018

(51) Int. Cl.
| | |
|---|---|
| *H04W 64/00* | (2009.01) |
| *H04W 8/04* | (2009.01) |
| *H04W 4/12* | (2009.01) |
| *H04W 4/029* | (2018.01) |
| *H04W 4/90* | (2018.01) |
| *H04W 88/16* | (2009.01) |
| *H04W 8/12* | (2009.01) |

(52) U.S. Cl.
CPC .......... *H04W 64/00* (2013.01); *H04W 4/029* (2018.02); *H04W 4/12* (2013.01); *H04W 4/90* (2018.02); *H04W 8/04* (2013.01); *H04W 8/12* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,043,754 | B2 | 5/2006 | Arnouse |
| 8,045,956 | B2 | 10/2011 | Sun et al. |
| 8,615,217 | B2 | 12/2013 | Ravishankar et al. |
| 8,879,431 | B2 | 11/2014 | Ridel et al. |
| 9,060,263 | B1 | 6/2015 | Carames et al. |

(Continued)

FOREIGN PATENT DOCUMENTS

| | | |
|---|---|---|
| EP | 1 067 492 A2 | 1/2001 |
| WO | WO 2019/005287 A1 | 1/2019 |
| WO | WO 2019/027813 A1 | 2/2019 |

OTHER PUBLICATIONS

"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).

(Continued)

*Primary Examiner* — German Viana Di Prisco
(74) *Attorney, Agent, or Firm* — Jenkins, Wilson, Taylor & Hunt, P.A.

(57) ABSTRACT

Methods, systems, and computer readable media for validating subscriber location information are disclosed. One method occurs at a network node. The method includes receiving a message containing location information associated with a subscriber. The method also includes determining whether the location information is valid based on a location validation algorithm, wherein the location validation algorithm uses prior location information associated with the subscriber in determining with the location information is valid. The method further includes performing at least one action based on the determining.

18 Claims, 7 Drawing Sheets

(56) References Cited

U.S. PATENT DOCUMENTS

| | | | |
|---|---|---|---|
| 9,191,803 B2 | 11/2015 | Patel et al. | |
| 9,240,946 B2 | 1/2016 | Cai et al. | |
| 9,374,840 B2 | 6/2016 | Monedero Recuero | |
| 9,538,335 B1* | 1/2017 | Bank | H04W 12/12 |
| 9,628,994 B1 | 4/2017 | Gunyel et al. | |
| 10,021,738 B1 | 7/2018 | Mehta et al. | |
| 10,212,538 B2 | 2/2019 | Russell | |
| 10,237,721 B2 | 3/2019 | Gupta et al. | |
| 2003/0087647 A1* | 5/2003 | Hurst | H04W 64/00 |
| | | | 455/456.1 |
| 2004/0140908 A1 | 7/2004 | Gladwin et al. | |
| 2006/0068762 A1 | 3/2006 | Baldwin et al. | |
| 2006/0242414 A1* | 10/2006 | Corson | H04L 63/0807 |
| | | | 713/171 |
| 2007/0174082 A1 | 7/2007 | Singh | |
| 2008/0125116 A1 | 5/2008 | Jiang | |
| 2008/0207181 A1 | 8/2008 | Jiang | |
| 2008/0222038 A1 | 9/2008 | Eden | |
| 2009/0045251 A1 | 2/2009 | Jaiswal et al. | |
| 2009/0195349 A1 | 8/2009 | Frader-Thompson et al. | |
| 2010/0062789 A1* | 3/2010 | Agarwal | H04W 60/04 |
| | | | 455/456.1 |
| 2010/0100958 A1 | 4/2010 | Jeremiah | |
| 2010/0105355 A1 | 4/2010 | Nooren | |
| 2010/0130227 A1 | 5/2010 | Farthofer et al. | |
| 2010/0240361 A1 | 9/2010 | Jiang | |
| 2010/0313024 A1 | 12/2010 | Weniger et al. | |
| 2011/0014939 A1* | 1/2011 | Ravishankar | H04W 12/12 |
| | | | 455/515 |
| 2011/0029655 A1 | 2/2011 | Forbes, Jr. et al. | |
| 2011/0063126 A1 | 3/2011 | Kennedy et al. | |
| 2011/0124317 A1* | 5/2011 | Joo | H04L 63/18 |
| | | | 455/411 |
| 2011/0173122 A1 | 7/2011 | Singhal | |
| 2011/0191835 A1 | 8/2011 | Hawkes et al. | |
| 2011/0217979 A1* | 9/2011 | Nas | H04W 4/00 |
| | | | 455/433 |
| 2011/0225091 A1 | 9/2011 | Plastina et al. | |
| 2011/0307381 A1 | 12/2011 | Kim et al. | |
| 2012/0099715 A1 | 4/2012 | Ravishankar et al. | |
| 2012/0131121 A1 | 5/2012 | Snyder et al. | |
| 2012/0203663 A1 | 8/2012 | Sinclair et al. | |
| 2013/0171988 A1 | 7/2013 | Yeung et al. | |
| 2014/0199961 A1 | 7/2014 | Mohammed et al. | |
| 2014/0280645 A1 | 9/2014 | Shuman et al. | |
| 2014/0378129 A1 | 12/2014 | Jiang et al. | |
| 2015/0012415 A1 | 1/2015 | Livne et al. | |
| 2015/0188979 A1 | 7/2015 | Almeras et al. | |
| 2016/0088461 A1 | 3/2016 | Jiang | |
| 2016/0156647 A1 | 6/2016 | Engel et al. | |
| 2016/0165432 A1 | 6/2016 | Dubesset et al. | |
| 2016/0269566 A1 | 9/2016 | Gundamaraju et al. | |
| 2016/0292687 A1 | 10/2016 | Kruglick | |
| 2017/0345006 A1 | 11/2017 | Kohli | |
| 2018/0020324 A1 | 1/2018 | Beauford | |
| 2018/0109953 A1 | 4/2018 | He | |
| 2018/0205698 A1 | 7/2018 | Gupta et al. | |
| 2018/0310162 A1 | 10/2018 | Kim et al. | |
| 2019/0007788 A1 | 1/2019 | Russell | |
| 2019/0044932 A1 | 2/2019 | Kumar et al. | |

OTHER PUBLICATIONS

"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).

"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).

"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).

"Digital cellular telecommunications system (Phase 2+); Universal Monile Telecommunications System (UMTS); LTE; Location Services (LCS); Service description; Stage1 (3GPP TS 22.071 V 11.0.0 Release 11," ETSI TS 122 071 V11.0.0, pp. 1-50 (Oct. 2012).

"Digital cellular telecommunications system (Phase 2+); Universal Mobile Telecommunications System (UMTS); Circuit Switched (CS) fallback in Evolved Packet System (EPS); Stage 2 (3GPP TS 23.272 V 8.0.0 Release 8)," ETSI TS 123 272 V8.0.0. pp. 1-42 (Nov. 2008).

Commonly-assigned, co-pending U.S. Appl. No. 15/666,300 for "Methods, Systems, and Computer Readable Media for Mobility Management Entity (MME) Authentication for Outbound Roaming Subscribers Using Diameter Edge Agent (DEA)," (Unpublished, filed Aug. 1, 2017).

Commonly-assigned, co-pending U.S. Appl. No. 15/636,118 for "Methods, Systems, and Computer Readable Media for Validating User Equipment (UE) Location," (Unpublished, filed Jun. 28, 2017).

"LTE International Roaming Whitepaper," http://carrier.huawei.com/en/technical-topics/core-network/lte-roaming-whitepaper, pp. 1-16 (Downloaded from the Internet on May 12, 2017).

Final Office Action for U.S. Appl. No. 13/047,287 (dated Mar. 10, 2017).

Commonly-assigned, co-pending U.S. Appl. No. 15/408,155 for "Methods, Systems, and Computer Readable Media for Validating a Redirect Address in a Diameter Message," (Unpublished, filed Jan. 17, 2017).

"Edge Router (DEA)," http://www.mavenir.com/our-products/mobile/edge-router-dea, pp. 1-7 (Copyright 2017).

Non-Final Office Action for U.S. Appl. No. 13/047,287 (dated Aug. 25, 2016).

"Syniverse Guide to LTE Roaming and Interoperability," https://www.syniverse.com/assets/files/custom_content/lte-roaming-interoperability-guide.pdf, pp. 1-11 (Jan. 8, 2016).

"Diameter Signaling Control (DSC)," https://www.extent.com/diameter-signaling-control-dsc/, pp. 1-3 (Copyright 2016).

Kotte, "Analysis and Experimental Verification of Diameter Attacks in Long Term Evolution Networks," http://www.diva-portal.org/smash/get/diva2:951619/FULLTEXT01.pdf, pp. 1-72 (2016).

Advisory Action Before the Filing of an Appeal Brief for U.S. Appl. No. 13/047,287 (dated Oct. 16, 2015).

"The Dialogic® Helix™ Signaling Controller," https://www.dialogic.com/-/media/products/docs/brochures/14090-helix-br.pdf, pp. 1-5 (Aug. 2015).

Final Office Action for U.S. Appl. No. 13/047,287 (dated Jun. 4, 2015).

"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).

Non-Final Office Action for U.S. Appl. No. 13/047,287 (dated Sep. 25, 2014).

Supplemental Notice of Allowance and Fee(s) Due for U.S. Appl. No. 12/823,559 (dated Aug. 23, 2013).

Notice of Allowance and Fee(s) Due for U.S. Appl. No. 12/823,559 (dated Aug. 1, 2013).

Email to U.S. Patent and Trademark Office dated Jun. 28, 2013.

Final Office Action for U.S. Appl. No. 12/823,559 (dated Apr. 11, 2013).

Final Office Action for U.S. Appl. No. 13/047,287 (dated Jan. 31, 2013).

Non-Final Office Action for U.S. Appl. No. 12/823,559 (dated Nov. 14, 2012).

(56) References Cited

OTHER PUBLICATIONS

Restriction and/or Election Requirement for U.S. Appl. No. 12/823,559 (dated Aug. 27, 2012).
Non-Final Office Action for U.S. Appl. No. 13/047,287 (dated Jun. 6, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Press Release, "SmartSynch SmartMeters Communicate Using the Larges and Most Available Wireless Networks in the World," http://www.smartsynch.com/SmartSynch_gprs.htm (Downloaded from the Internet on Jul. 5, 2011).
"Solution: Itron CENTRON GPRS," Data Sheet, http://www.smartsynch.com/SmartSynch_itron_centron.htm (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm Feb. 3, 2009 (Downloaded from the Internet on Jul. 5, 2011).
"NES System Architecture," Data Sheet, Copyright 2009 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008 (Downloaded from the Internet on Jul. 5, 2011).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, 3 pgs. (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
Hakala et al., "Diameter Credit-Control Application," RFC 4006, pp. 1-115 (Aug. 2005).
"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
Examiner's Answer for U.S. Appl. No. 13/047,287 (dated Feb. 26, 2018).
Non-Final Office Action for U.S. Appl. No. 15/408,155 (dated Jan. 9, 2018).
Notice of Allowance and Fee(s) Due for U.S. Appl. No. 15/636,118 (dated Apr. 27, 2018).
Final Office Action for U.S. Appl. No. 15/408,155 (dated Jul. 26, 2018).
Notice of Allowance and Fee(s) Due for U.S. Appl. No. 15/636,118 (dated Oct. 3, 2018).
Notification of Transmittal of the International Search Report and the Written Opinion of the International Searching Authority, or the Declaration for International Application No. PCT/US2018/030319 (dated Aug. 20, 2018).
Commonly-assigned, co-pending U.S. Appl. No. 16/100,172 for "Methods, Systems, and Computer Readable Media for Conducting a Time Distance Security Countermeasure for Outbound Roaming Subscribers Using Diameter Edge Agent," (Unpublished, filed Aug. 9, 2018).
Commonly-assigned, co-pending U.S. Appl. No. 16/035,008 for "Methods, Systems, and Computer Readable Media for Validating a Visitor Location Register (VLR) Using a Signaling System No. 7 (SS7) Signal Transfer Point (STP)," (Unpublished, filed Jul. 13, 2018).
Commonly-assigned, co-pending U.S. Appl. No. 16/024,422 for "Methods, Systems, and Computer Readable Media for Network Node Validation," (Unpublished, filed Jun. 29, 2018).
"Draft LS on network verification of UE provided location," 3GPP TSG SA WG2 Meeting #81, pp. 1 (Oct. 11-15, 2010).
Notice of Allowance and Fee(s) Due for U.S. Appl. No. 16/035,008 (dated Jan. 18, 2019).
Notice of Allowance and Fee(s) Due and Applicant-Initiated Interview Summary for U.S. Appl. No. 15/408,155 (dated Oct. 31, 2018).
Notification of Transmittal of the International Search Report and the Written Opinion of the International Searching Authority, or the Declaration for International Patent Application No. PCT/US2018/043985 (dated Oct. 9, 2018).
Non-Final Office Action for U.S. Appl. No. 16/100,172 (dated Apr. 11, 2019).

\* cited by examiner

METHODS, SYSTEMS, AND COMPUTER READABLE MEDIA FOR VALIDATING SUBSCRIBER LOCATION INFORMATION

TECHNICAL FIELD

The subject matter described herein relates to methods and systems for preventing fraud related to communications networks. More particularly, the subject matter described herein relates to methods, systems, and computer readable media for validating subscriber location information.

BACKGROUND

Communications networks can be targeted by malicious actors for a variety of reasons, e.g., financial gain, espionage, or political aims. For example, vulnerabilities associated with signaling system number 7 (SS7) networks and Diameter networks allow some entities to commit revenue fraud, perform unauthorized call interceptions or call taps, and/or steal personal subscriber information. When such issues occur, many times an innocent party may be held responsibility for rectifying and/or mitigating the damage. While network operators generally use security appliances, firewalls, and/or other devices to help prevent unauthorized access to their networks and customers, numerous issues can still exist within their networks due to the inherent security issues associated with protocols and/or procedures used in these networks.

SUMMARY

Methods, systems, and computer readable media for validating subscriber location information are disclosed. One method occurs at a network node. The method includes receiving a message containing location information associated with a subscriber. The method also includes determining whether the location information is valid based on a location validation algorithm, wherein the location validation algorithm uses prior location information associated with the subscriber in determining with the location information is valid. The method further includes performing at least one action based on the determining.

One system includes a network node. The network node includes at least one processor and memory. The network node is configured for receiving a message containing location information associated with a subscriber; determining whether the location information is valid based on a location validation algorithm, wherein the location validation algorithm uses prior location information associated with the subscriber in determining with the location information is valid; and performing at least one action based on the determining.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms 'node' refers to a physical computing platform including one or more processors and memory.

As used herein, the terms 'function' or 'module' refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for validating subscriber location information. Vulnerabilities exist in various communications networks, including mobile communications networks. For example, a malicious network node may be programmed or otherwise configured to generate and send a fraudulent mobility management message (e.g., update location messages) to a home network of one or more subscribers. In this example, a fraudulent message may include a subscriber and/or user device identifier (e.g., an international mobile subscriber identity (IMSI) or a MSISD) and may provide location information indicating that the subscriber is roaming in its network. Since such networks do not validate mobility management messages or location information therein, a home network or a node therein may act on fraudulent mobility management messages by providing the malicious network node with subscriber data (e.g., a subscriber profile) which can be utilized to commit revenue fraud, perform call interception, steal subscriber profile details, and/or other malicious activities.

In accordance with some aspects of the subject matter described herein, techniques, methods, systems, or mechanisms are disclosed for validating subscriber location information. For example, a network node may use a location validation algorithm for determining whether subscriber location information or a related message is valid. In some embodiments, the location validation algorithm may use prior location information and, optionally, timing information associated with subscriber registrations or mobility management messages in determining with the location information is valid. In some embodiments, if location information or a related message is determined to be invalid (e.g., fraudulent, erroneous, inappropriate, etc.) or likely to be invalid, the network node may perform one or more actions, such as discarding the message, notifying a network operator of potential malicious activities, or other mitigating actions.

Advantageously, by validating subscriber location information in various messages and performing one or more mitigating actions when subscriber location information is determined to be invalid or likely to be invalid, malicious activities and their negative consequences (e.g., revenue fraud) can be avoided and/or prevented.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
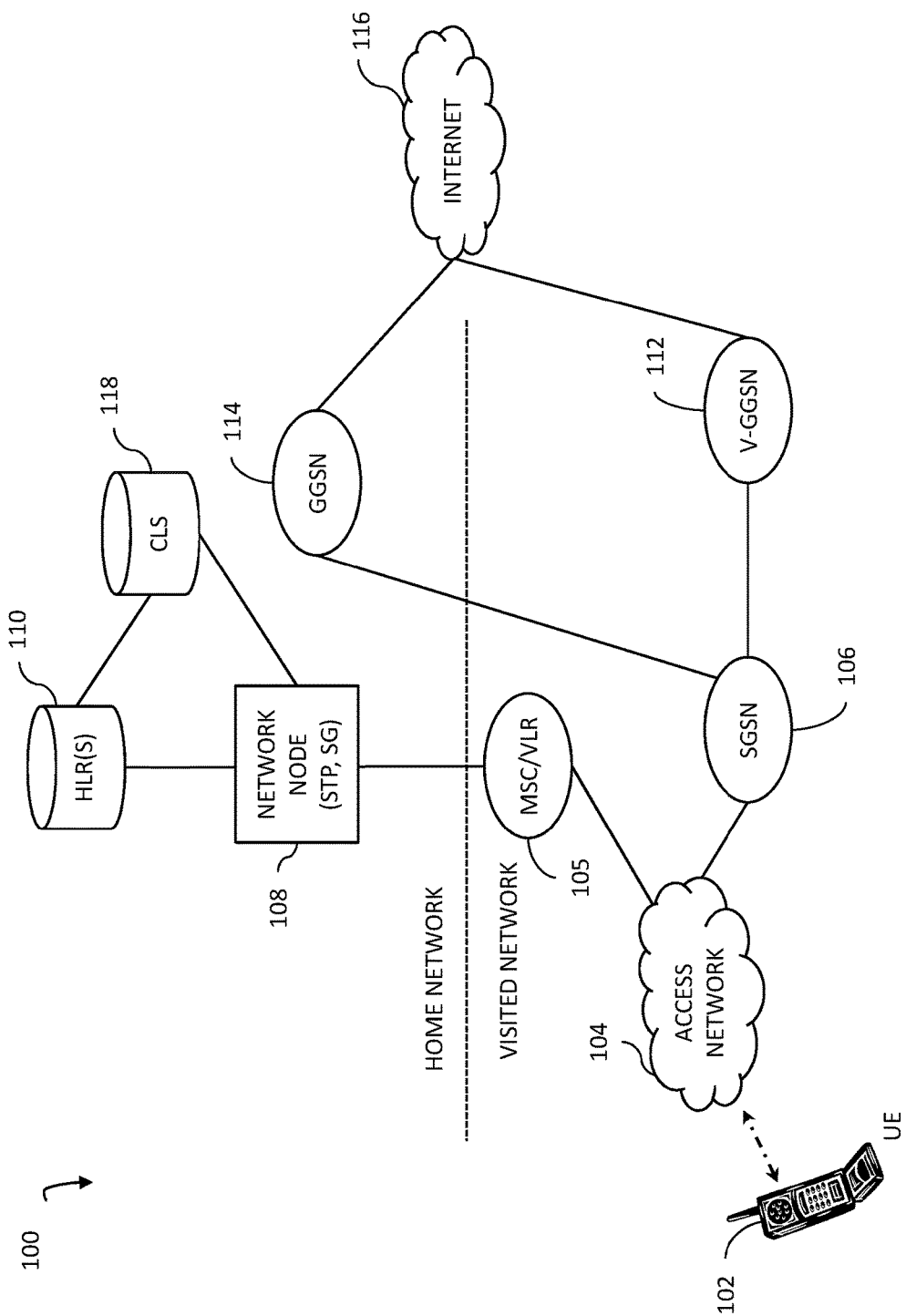
FIG. 1 is a diagram illustrating an example communications environment for validating subscriber location information.

FIG. 1 is a diagram illustrating an example communications environment 100 for validating subscriber location information. FIG. 1 includes a UE 102 (e.g., a mobile device, a computer, a tablet computing platform, or a smartphone) capable of roaming or moving between different portions of a communications environment 100. In some embodiments, communications environment 100 may include one or more nodes associated with a third generation (3G) network and/or a second generation (2G) network.

Communications environment 100 may include a home network (e.g., a home public land mobile network (HPLMN)) and a visited network (e.g., a visited public land mobile network (VPLMN)). The home network may be associated with UE 102 and may be the UE's default network, while the visited network may be a network that UE 102 may use, may attempt to use, or may appear to use while roaming outside the home network's coverage area. In some embodiments, the home network and the visited network may include nodes for communicating with an external network, such as Internet 116.

The home network may include various nodes, e.g., a gateway general packet radio service (GPRS) support node (GGSN) 114, a network node (NN) 108, a home location register (HLR) 110 and/or a centralized location server (CLS) 118. In some embodiments, a home network may be configured as a subscriber's default roaming provider. In some embodiments, a home network may be configured to allow a subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access). For example, an ARP may provide data services at lower rates than a subscriber's home network and may also help in alleviating network load or congestion in the subscriber's home network by handling some subscribers' IP traffic.

GGSN 114 may be any suitable entity for providing access to Internet 116 or other data networks, e.g., an Internet access point. In some embodiments, if serving GPRS support node (SGSN) 106 receives a signaling message indicating that a roaming subscriber cannot receive data services via an ARP, SGSN 106 may route IP traffic and/or related messages destined for Internet 116 via GGSN 114 in the home network.

HLR(s) 110 may represent any suitable entity or entities for maintaining and/or providing one or more subscriber data management (SDM) or customer relationship management (CRM) functions. HLR(s) 110 may maintain subscriber-related information, such as user identification, control information for user authentication and authorization, location information, and user profile data. For example, HLR(s) 110 may include a database containing details about a subscriber identity module (SIM) card associated with UE 102, services available to UE 102, and the current location (e.g., current serving node) of UE 102.

In some embodiments, where HLR(s) 110 involves multiple nodes, each node may maintain information for a portion of subscribers, e.g., hundreds of thousands to millions of subscribers and various nodes in communications environment 100 may be configured to identify and consult the appropriate node for information about a particular subscriber.

In some embodiments, HLR(s) 110 may perform mobility management procedures in response to receiving a MAP message or other messages. Mobility management messages may be received from SGSN 106 or other nodes in communications environment 100.

NN 108 may be any suitable entity (e.g., one or more computing platforms or devices) for receiving, processing, routing, and/or forwarding messages. In some embodiments, NN 108 may include a gateway, a signaling router, a signaling platform, a signal transfer point (STP), a signaling system number 7 (SS7) node, or a signaling node.

In some embodiments, NN 108 may include functionality for facilitating communications between nodes in the home network and nodes in the visited network. For example, mobility management messages and/or registration related messages may be sent from SGSN 106 to HLR(s) 110 via NN 108. While only one SP is depicted in communications environment 100, it will be appreciated that multiple SPs may be used to facilitate communication between nodes in communications environment 100.

In some embodiments, NN 108 may include functionality for filtering and/or validating messages and/or for performing global title translation (GTT). For example, NN 108 may analyze header information in signaling messages and may determine how to process or route the signaling messages. In this example, some filtering may include determining whether a signaling message is addressed to an appropriate node or includes appropriate parameters or other information. GTT may include identifying an appropriate destination for a signaling message (e.g., based on global title information) and routing the signaling message to the identified destination.

In some embodiments, NN 108 may include functionality for identifying messages that contain subscriber location information, such as mobility management messages from roaming subscribers. For example, NN 108 may be configured to use GTT functionality, such as filters associated with signaling connection control part (SCCP) subsystem numbers (SSNs) or MAP operation codes (opcodes) to identify relevant messages. In this example, NN 108 may identify relevant messages by filtering signaling messages associated with HLR(s) 110 (e.g., a calling party (CgPN) SSN='6') and/or SGSN 106 (e.g., a called party (CdPN) SSN='149') and/or by filtering certain types of signaling messages using opcodes (e.g., MAP ISD messages may be associated with an opcode value of 7').

In some embodiments, location information may include any information usable for identifying a location of a UE or an associated subscriber. For example, location information may include a mobile country code (MCC) a mobile network code (MNC), a location area code (LAC), a network identifier, a cell global identifier (CGI), a base station identifier (BSID), an access node identifier, a cell identity (CI), a service area code (SAC), a routing area identity (RAI), a routing area code (RAC), a tracking area identity (TAI), a tracking area code (TAC), an eUTRAN CGI (EGCI), location coordinates (e.g., global positioning system (GPS) information), and relative location information.

In some embodiments, NN 108 may include functionality for performing a location validation analysis on a message or related location information therein. For example, NN 108 may be configured to analyze a payload portion of a message and retrieve subscriber location information. In this example, NN 108 may perform a location validation analysis that includes executing one or more location validation algorithms and/or rules for determining whether the location information is valid or appears to be valid.

In some embodiments, a location validation analysis or a related location validation algorithm may include determining whether subscriber location in a message is valid (or appears valid) based on or affected by various factors, such as historical (e.g., prior) location information, network traffic statistics, subscriber movement patterns, a home network location, a visited network location, a network condition, a service agreement, a subscriber tier, a device type, a time of day, a requested service, a QoS requirement, and/or a QoE requirement. For example, a location validation analysis or a related location validation algorithm may consult a blacklist associated with APNs or other information that indicates malicious actors and/or likely to be invalid locations. In this example, if the subscriber location information is associated with a blacklisted entry, the subscriber location information and/or related message may be deem invalid. In example, a location validation analysis or a related location validation algorithm may consult a whitelist associated with APNs or other information that indicates benign actors and/or likely to be valid locations. In this example, if the subscriber location information is associated with a whitelisted entry, the subscriber location information and/or a related message may be deem valid.

In some embodiments, whitelists and/or blacklists usable in validating subscriber location may be different for various subscribers based on one or more factors, such as prior location information, network information, reported activities, and/or known or derivable movement patterns. For example, whitelisted entries may be generated based on previous location information associated with a subscriber that is gathered over a particular amount of time. In another example, blacklisted entries may be generated based on reported and/or confirmed fraudulent activities (e.g., from other subscribers or network operators) associated with particular APNs or related location information.

In some embodiments, a location validation analysis or a related location validation algorithm may use prior location information to identify a movement pattern associated with the subscriber and may determine that location information in a message is invalid if the location information does not correspond to the movement pattern. For example, a movement pattern associated with a user may be derived be analyzing location information over a month or other period of time. In this example, the movement pattern may indicate that the subscriber visited a total of 5 different APNs and never encountered more than three during the work week (e.g., Monday through Friday) and that the subscriber is always registered with a APN 'ABC' from 2 a.m.-7a.m. Continuing with this example, if location information indicates that the subscriber is roaming in APN 'XYZ' at 3 a.m. and the movement pattern indicates that APN 'XYZ' has never previously been visited by the subscriber, a location validation analysis or a related location validation algorithm may use the movement pattern to determine that the location information is invalid (or likely to be invalid).

In some embodiments, a location validation analysis or a related location validation algorithm may use prior location information along with timing information and may determine that the location information in the message is invalid if the timing information associated with location information in a message is suspicious based on a distance between the location information in the message and a most recent prior location information and an amount of time between the timing information associated with the location information in the message and the timing information associated with the most recent prior location information. For example, if a subscriber previously registered with an APN 'USA' and then five minutes later, a subscriber appears to attempt registration with an APN 'RUS', a location validation analysis or a related location validation algorithm may involve calculating an approximate geographical distance between APN 'USA' and APN 'RUS' and calculating an approximate amount of time to travel this distance for the subscriber (e.g., using various travel speeds based on flight, car, walking, etc.). In this example, if the location validation analysis or the related location validation algorithm determines that the distance is impossible to travel in the five minutes between the registration attempts, then the location information may be determined to be invalid (or likely to be invalid).

In some embodiments, NN 108 may be configured to perform one or more actions based on a location validation analysis or a related determination. For example, in response to determining that location information is valid, NN 108 may forward a related message to a location register (e.g., HLR(s) 110 or CLS 118), may send a message to a node (e.g., a network operator management center) indicating that the location information is valid, and/or may copy or store a portion of the message, e.g., for storing in a local memory or in a memory associated with CLS 118. In another example, in response to determining that the location information is invalid, NN 108 may screen, filter, or discard a related message, may stop a related message from reaching a location register, may send a message to a node indicating that the location information is invalid, and/or may copy or store a portion of the message.

In some embodiments, NN 108 may be configured to modify, delete, and/or add subscriber location information. For example, if NN 108 determines that a message includes location information that is invalid or likely invalid, NN 108 may discard the message and/or notify a network operator of a potentially malicious activity. In another example, if NN 108 determines that a message includes location information that is valid or likely valid, NN 108 may forward the message to HLR(s) 110 and/or CLS 118 without changing the location information. In yet another example, if NN 108 determines that a message should include additional and/or different information, NN 108 may modify the message to include valid subscriber location information prior to forwarding the message.

CLS 118 may represent any suitable entity for maintaining and/or providing a repository for subscriber location information. For example, CLS 118 may be queried by other nodes in communications environment 100 to determine the current location of any mobile subscriber, regardless of which HLR(s) 110 stores that particular mobile subscriber's information.

In some embodiments, CLS 118 may receive subscriber location information from many sources, e.g., mobile switching center (MSCs), visitor location registers (VLRs), call/setup control functions (CSCFs), NN 108, HLR(s) 110, SGSN 106, GGSN 114, V-GGSN 112, and/or other nodes. In some embodiments, NN 108 and/or other SPs in communications environment 100 may be configured to send subscriber location information to CLS 118 in response to receiving or intercepting messages containing such information.

In some embodiments, CLS 118 may include similar functionality for validating subscriber location information as described above with regard to NN 108. For example, CLS 118 may receive a MAP update location message or location information therefrom and may determine whether the location information is valid based on one or more location validation analyses and/or algorithms similar to those described above. Continuing with this example, after analyzing the update location message, CLS 118 may send a message or otherwise indicate to NN 108 that the location information and/or the update location message are valid or invalid.

The visited network may include an access network 104, a mobile switching center and/or visitor location register (MSC/VLR) 105, SGSN 106, and a visitor GGSN (V-GGSN) 112. Access network 104 may represent a radio access network and may include various nodes for communicating with UE 102 and elements within communications environment 100. Example nodes in access network 104 may include a node B (NB), a radio network controller, a base station, or other transceiver node, which may perform radio access functions. Access network 104, or nodes therein, may be used for communications between UE 102 and nodes in the visited network or communications environment 100. For example, an NB or other node (e.g., a gateway) may communicate UE-related messages (e.g., authentication or mobility related messages) to SGSN 106 or other nodes.

MSC/VLR 105 may represent any suitable entity or entities for performing one or more mobility management functions, such as tracking UE 102. In some embodiments, MSC/VLR 105 may communicate information (e.g., mobility-related information) to other nodes in communications environment 100. For example, MSC/VLR 105 may receive registration requests from a transceiver node in access network 104 and may communicate with HLR(s) 110 for performing authentication and/or for updating the current location of the subscriber. MSC/VLR 105 may also maintain or store location information for roaming subscribers. Additionally, MSC/VLR 105 may communicate with various other nodes and perform various other functions.

SGSN 106 represents a node or gateway for facilitating communications between access network 104 and other nodes (e.g., V-GGSN 112) or networks. In some embodiments, SGSN 106 may communicate user traffic to other nodes in communications environment 100. In some embodiments, SGSN 106 may also perform one or more mobility management functions.

V-GGSN 112 may be any suitable entity for providing access to Internet 116 or other data networks, e.g., an Internet access point. In some embodiments, if SGSN 106 receives a signaling message indicating that a roaming subscriber can receive data services via an ARP, SGSN 106 may route IP traffic and/or related messages destined for Internet 116 via V-GGSN 112 in the visited network. In some embodiments, if SGSN 106 receives a signaling message indicating that a roaming subscriber cannot receive data services via an ARP, SGSN 106 may route IP traffic and/or related messages destined for Internet 116 via GGSN 114 in the home network instead of via V-GGSN 112.

It will be appreciated that FIG. 1 is for illustrative purposes and that various nodes and/or modules, locations, and/or functionality described above in relation to FIG. 1 may be changed, altered, added, or removed.

Figure 2:
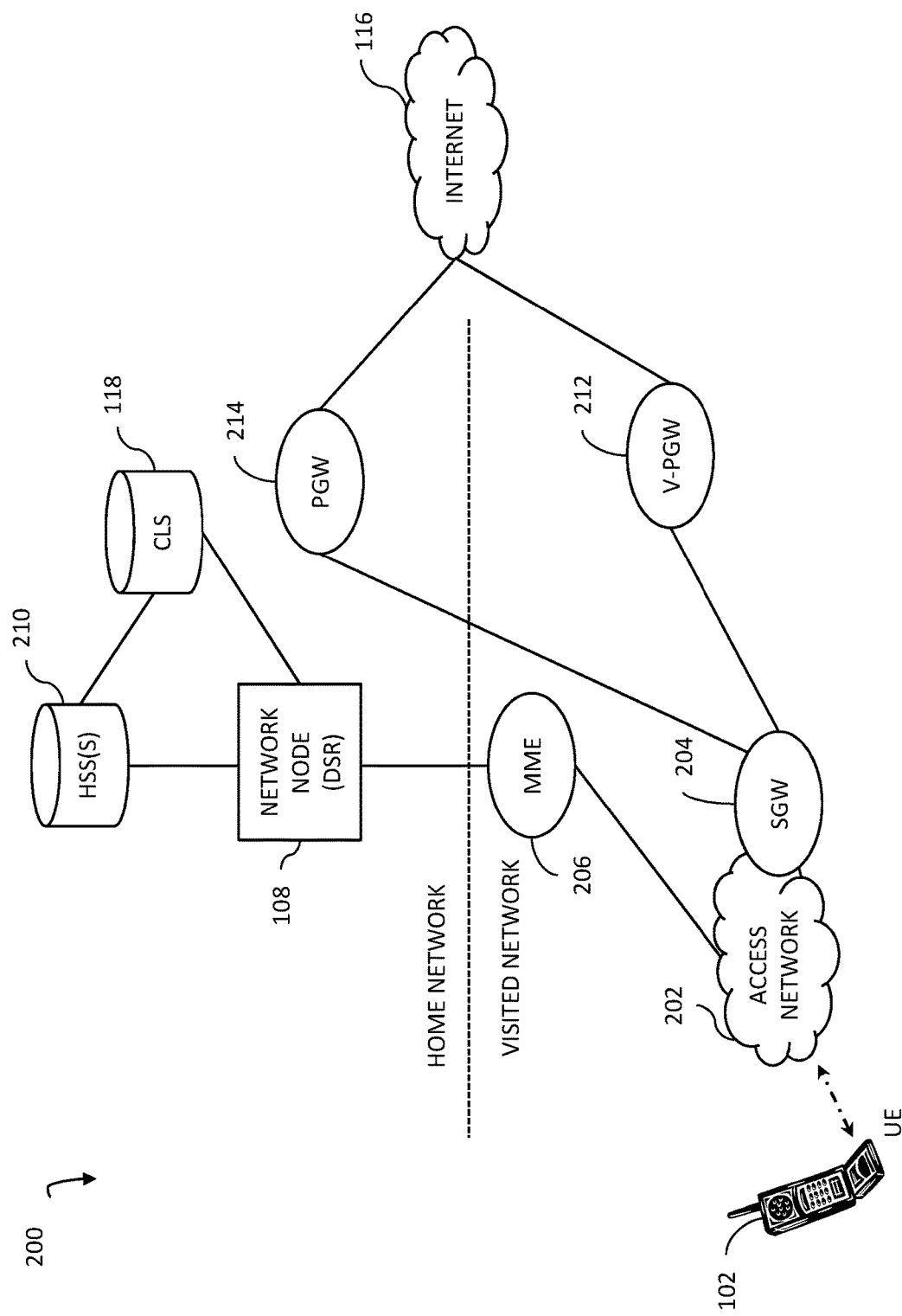
FIG. 2 is a diagram illustrating another example communications environment for validating subscriber location information.

FIG. 2 is a diagram illustrating another example communications environment 200 for validating subscriber location information. FIG. 2 includes a UE 102 (e.g., a mobile device, a tablet computing platform, or a smartphone) capable of roaming or moving between different portions of a communications environment 200. In some embodiments, communications environment 200 may include one or more nodes associated with a fourth generation (4G) network, a long term evolution (LTE) network, a LTE-advanced network, and/or an evolved packet core (EPC) network.

Communications environment 200 may include a home network (e.g., an HPLMN) and a visited network (e.g., a VPLMN). The home network may be associated with UE 102 and may be the UE's default network, while the visited network may be a network that UE 102 may use or may attempt to use while roaming outside the home network's coverage area. In some embodiments, the home network and the visited network may include nodes for communicating with an external network, such as Internet 116.

The home network may include various nodes, e.g., a packet gateway (PGW) 214, NN 108, one or more home subscriber servers (HSSs) 210, and/or CLS 118. In some embodiments, a home network may be configured as a subscriber's default roaming provider. In some embodiments, a home network may be configured to allow a subscriber to change his roaming provider, e.g., for a certain or specified period of time.

In some embodiments, a home network and/or its related nodes may be configured to handle data services (e.g., Internet access), e.g., even when its subscribers are using a visited network for voice services. For example, a home network may handle data services for a roaming subscriber by routing a data flow service request through its network regardless of whether a visited network can provide the same services quicker or more cheaply.

In some embodiments, a home network and/or its related nodes may be configured to allow a network operator or service provider that is different from a home network's operator or service provider, referred to herein as an ARP, to provide data services (e.g., Internet access). For example, an ARP may provide data services at lower rates than a subscriber's home network and may also help in alleviating network load or congestion in the subscriber's home network by handling some subscribers' IP traffic.

PGW 214 may be any suitable entity for providing access to Internet 116 or other data networks, e.g., an Internet access point. For example, a serving gateway (SGW) 204 may communicate with PGW 214 to provide Internet access. In some embodiments, if SGW 204 receives a signaling message indicating that a roaming subscriber cannot receive data services via an ARP, SGW 204 may route IP traffic and/or related messages destined for Internet 116 via PGW 214 in the home network.

HSS(s) 210 may represent any suitable entity or entities for maintaining and/or providing one or more SDM or CRM functions. HSS(s) 210 may maintain subscriber-related information, such as user identification, control information for user authentication and authorization, location information, and user profile data. For example, HSS(s) 210 may include a database containing details about a subscriber identity module (SIM) card associated with UE 102, services available to UE 102, and the current location (e.g., current serving node) of UE 102.

In some embodiments, where HSS(s) 210 involves multiple nodes, each node may maintain information for a portion of subscribers, e.g., hundreds of thousands to millions of subscribers and various nodes in communications environment 100 may be configured to identify and consult the appropriate node for information about a particular subscriber.

In some embodiments, HSS(s) 210 may perform mobility management procedures in response to receiving a Diameter message or other messages. Mobility management messages may be received from mobility management entity (MME) 206 or other nodes in communications environment 200.

NN 108 may be any suitable entity (e.g., one or more computing platforms or devices) for receiving, processing, routing, and/or forwarding messages. In some embodiments, NN 108 in communications environment 200 may include functionality similar to functionality of NN 108 in communications environment 100. In some embodiments, NN 108 may include a Diameter relay agent and/or a Diameter signaling router (DRA/DSR). For example, NN 108 may route and/or forward various Diameter messages between nodes in communications environment 200.

In some embodiments, NN 108 may include functionality for facilitating communications between nodes in the home network and nodes in the visited network. For example, mobility management messages and/or registration related messages may be sent from MME 206 to HSS(s) 210 via NN 108. While only one SP is depicted in communications environment 200, it will be appreciated that multiple SPs may be used to facilitate communication between nodes in communications environment 200.

In some embodiments, NN 108 may include functionality for filtering and/or validating messages. For example, NN 108 may analyze attribute value pair (AVP) information in Diameter signaling messages and may determine how to process or route the signaling messages.

In some embodiments, NN 108 may use filtering for identifying messages that contain subscriber location information, such as mobility management messages from roaming subscribers. For example, NN 108 may be configured to use filters associated with an application identifier (e.g., Application-ID='16777251' may indicate a S6a interface message between HSS(s) 210 and MME 206) and/or command codes (e.g., a Diameter Insert-Subscriber-Data-Request (IDR) message may be associated with a command code of '319' and a Diameter Update-Location-Request (ULR) message may be associated with a command code of '316'. In this example, NN 108 may be configured to identify relevant messages based on such filters.

In some embodiments, location information may include any information usable for identifying a location of a UE or an associated subscriber. For example, location information may include an MCC, an MNC, a LAC, a network identifier, a CGI, a BSID, an access node identifier, a CI, a SAC, a RAI, a RAC, a TAI, a TAC, an EGCI, location coordinates (e.g., GPS information), and relative location information.

In some embodiments, NN 108 may include functionality for validating subscriber location information in Diameter messages. For example, NN 108 may be configured to analyze a payload portion of a Diameter signaling message and retrieve subscriber location information. In this example, NN 108 may perform a location validation analysis that includes executing one or more location validation algorithms (e.g., those described above with regard to FIG. 1) and/or rules for determining whether the location information is valid or appears to be valid.

In some embodiments, NN 108 may include functionality for performing a location validation analysis on a message or related location information therein. For example, NN 108 may be configured to analyze a payload portion of a signaling message and retrieve subscriber location information from the signaling message. In this example, NN 108 may perform a location validation analysis that includes executing one or more location validation algorithms and/or rules for determining whether the location information is valid or appears to be valid.

In some embodiments, NN 108 may be configured to perform one or more actions based on a location validation analysis or a related determination. For example, in response to determining that location information is valid, NN 108 may forward a related message to a location register (e.g., HSS(s) 210 or CLS 118), may send a message to a node (e.g., a network operator management center) indicating that the location information is valid, and/or may copy or store a portion of the message, e.g., for storing in a local memory or in a memory associated with CLS 118. In another example, in response to determining that the location information is invalid, NN 108 may screen, filter, or discard a related message, may stop a related message from reaching a location register, may send a message to a node indicating that the location information is invalid, and/or may copy or store a portion of the message.

In some embodiments, NN 108 may be configured to modify, delete, and/or add subscriber location information. For example, if NN 108 determines that a message includes location information that is invalid or likely invalid, NN 108 may discard the message and/or notify a network operator of a potentially malicious activity. In another example, if NN 108 determines that a message includes location information that is valid or likely valid, NN 108 may forward the message to HSS(s) 210 and/or CLS 118 without changing the location information. In yet another example, if NN 108 determines that a message should include additional and/or different information, NN 108 may modify the message to include valid subscriber location information (e.g., in a Visited-PLMN-Id AVP) prior to forwarding the message.

CLS 118 may represent any suitable entity for maintaining and/or providing a repository for subscriber location information. For example, CLS 118 may be queried by other nodes in communications environment 200 to determine the current location of any mobile subscriber, regardless of which HSS(s) 210 stores that particular mobile subscriber's information.

In some embodiments, CLS 118 may receive subscriber location information from many sources, e.g., NN 108, HSS(s) 210, SGW 204, PGW 214, V-PGW 212, and/or other nodes. In some embodiments, NN 108 and/or other SPs in communications environment 200 may be configured to send subscriber location information to CLS 118 in response to receiving or intercepting messages containing such information.

In some embodiments, CLS 118 may include similar functionality for validating subscriber location information as described above with regard to NN 108. For example, CLS 118 may receive a Diameter update location message or location information therefrom and may determine whether the location information is valid based on one or more location validation analyses and/or algorithms similar to those described above. Continuing with this example, after analyzing the update location message, CLS 118 may send a message or otherwise indicate to NN 108 that the location information and/or the update location message are valid or invalid.

The visited network may include an access network 202, MME 206 SGW 204, and a visitor PGW (V-PGW) 212. Access network 202 may represent a radio access network and may include various nodes for communicating with UE 102 and elements within communications environment 200. Example nodes in access network 202 may include an evolved node b (eNB) or other transceiver node, which may perform radio access functions. Access network 202, or nodes therein, may be used for communications between UE 102 and nodes in the visited network or communications environment 200. For example, an eNB or other node (e.g., SGW 204) may communicate UE-related messages (e.g., authentication or mobility related messages) to MME 206 or other nodes.

SGW 204 represents a node or gateway for facilitating communications between access network 202 and other nodes (e.g., V-PGW 212) or networks. In some embodiments, SGW 204 may communicate user traffic to other nodes in communications environment 200.

MME 206 may represent any suitable entity for performing one or more mobility management functions, such as tracking UE 102. In some embodiments, SGW 204 may communicate information (e.g., mobility-related information) to other nodes in communications environment 200. For example, MME 206 may receive registration requests from a transceiver node in access network 202 and may communicate with HSS(s) 210 for performing authentication and/or for updating the current location of the subscriber. Additionally, MME 206 may communicate with various other nodes and perform various other functions.

V-PGW 212 may be any suitable entity for providing access to Internet 116 or other data networks, e.g., an Internet access point. In some embodiments, if SGW 204 receives a signaling message indicating that a roaming subscriber can receive data services via an ARP, SGW 204 may route IP traffic and/or related messages destined for Internet 116 via V-PGW 212 in the visited network. In some embodiments, if SGW 204 receives a signaling message indicating that a roaming subscriber cannot receive data services via an ARP, SGW 204 may route IP traffic and/or related messages destined for Internet 116 via PGW 214 in the home network instead of via V-PGW 212.

It will be appreciated that FIG. 2 is for illustrative purposes and that various nodes and/or modules, locations, and/or functionality described above in relation to FIG. 2 may be changed, altered, added, or removed.

Figure 3:
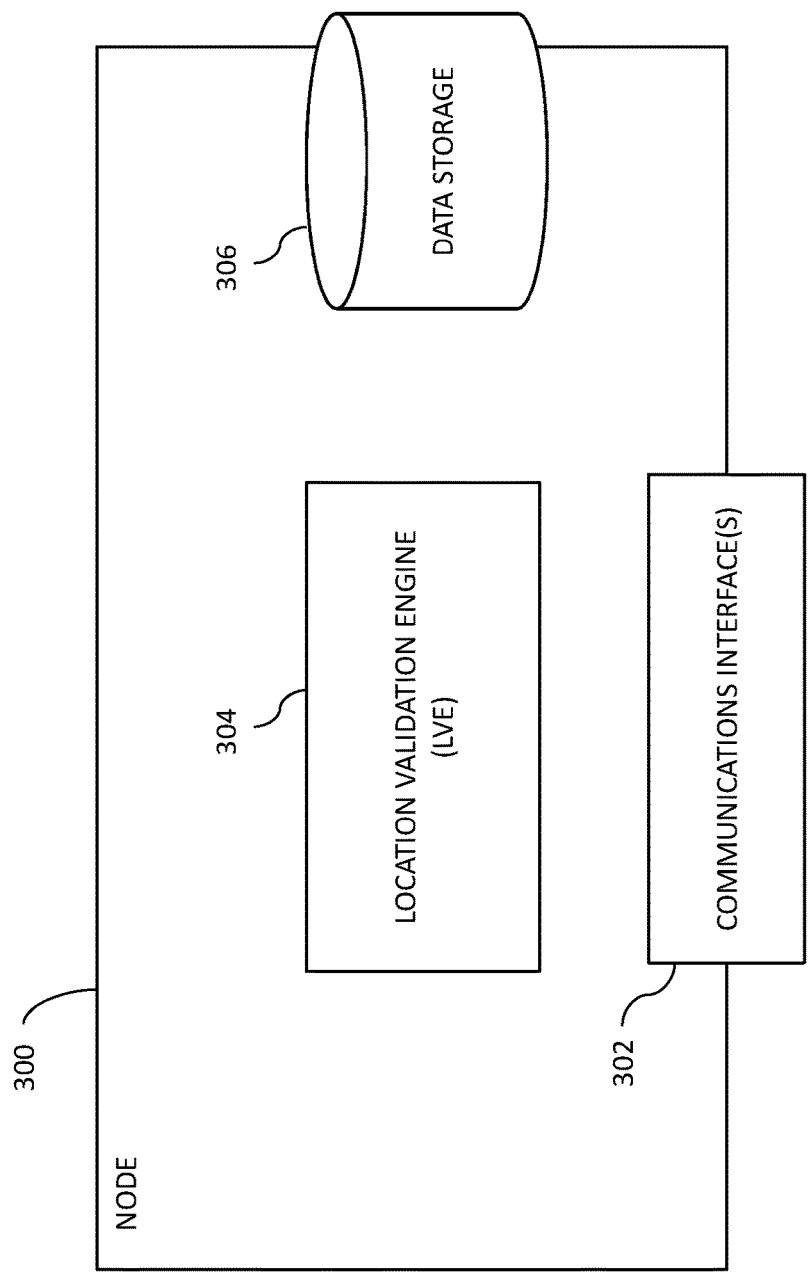
FIG. 3 is a diagram illustrating an example node for validating subscriber location information.

FIG. 3 is a diagram illustrating an example node 300 for validating subscriber location information. Node 300 may represent any suitable entity or entities for performing aspects of validating subscriber location information. In some embodiments, node 300 may represent NN 108 or CLS 118.

Referring to FIG. 3, node 300 may include one or more communications interface(s) 302 for communicating messages (e.g., via an SS7 interface, or a Diameter interface, or other interfaces). In some embodiments, communications interface(s) 302 may include a first communication interface for communicating with HLR(s) 110 and a second communications interface for communicating with HSS(s) 210.

In some embodiments, communications interface(s) 302 may be associated with one or more taps (e.g., computing platforms or devices) for intercepting and/or copying messages in communications environment 100 or communications environment 200.

Node 300 may include a location validation engine (LVE) 304. LVE 304 may be any suitable entity (e.g., software executing on at least one processor) for performing one or more aspects of validating subscriber location information. In some embodiments, LVE 304 may include functionality for identifying messages that contain subscriber location information, such as mobility management messages from roaming subscribers. For example, LVE 304 may identify relevant messages by filtering message based on header data and/or payload data.

In some embodiments, LVE 304 may include functionality for performing a location validation analysis on a message or related location information therein. For example, LVE 304 may be configured to analyze a payload portion of a message and retrieve subscriber location information. In this example, LVE 304 may perform a location validation analysis that includes executing one or more location validation algorithms and/or rules for determining whether the location information is valid or appears to be valid.

In some embodiments, a location validation analysis or a related location validation algorithm may include determining whether subscriber location in a message is valid (or appears valid) based on or affected by various factors, such as historical (e.g., prior) location information, network traffic statistics, subscriber movement patterns, a home network location, a visited network location, a network condition, a service agreement, a subscriber tier, a device type, a time of day, a requested service, a QoS requirement, and/or a QoE requirement.

In some embodiments, whitelists and/or blacklists usable in validating subscriber location may be different for various subscribers based on one or more factors, such as prior location information, network information, reported activities, and/or known or derivable movement patterns.

In some embodiments, a location validation analysis or a related location validation algorithm may use prior location information to identify a movement pattern associated with the subscriber and may determine that location information in a message is invalid if the location information does not correspond to the movement pattern.

In some embodiments, a location validation analysis or a related location validation algorithm may use prior location information along with timing information and may determine that the location information in the message is invalid if the timing information associated with location information in a message is suspicious based on a distance between the location information in the message and a most recent prior location information and an amount of time between the timing information associated with the location information in the message and the timing information associated with the most recent prior location information.

In some embodiments, LVE 304 may be configured to perform one or more actions based on a location validation analysis or a related determination. For example, in response to determining that location information is valid, LVE 304 may forward a related message to a location register (e.g., HLR(s) 110 or HSS(s) 210), may send a message to a node (e.g., a network operator management center) indicating that the location information is valid, and/or may copy or store a portion of the message, e.g., for storing in a local memory or in a memory associated with CLS 118. In another example, in response to determining that the location information is invalid, LVE 304 may screen, filter, or discard a related message, may stop a related message from reaching a location register, may send a message to a node indicating that the location information is invalid, and/or may copy or store a portion of the message.

In some embodiments, LVE 304 may be configured to modify, delete, and/or add subscriber location information. For example, if LVE 304 determines that a message includes location information that is invalid or likely invalid, LVE 304 may discard the message and/or notify a network operator of a potentially malicious activity. In another example, if LVE 304 determines that a message includes location information that is valid or likely valid, LVE 304 may forward the message to HLR(s) 110 and/or CLS 118 without changing the location information. In yet another example, if LVE 304 determines that a message should include additional and/or different information, LVE 304 may modify the message to include valid subscriber location information prior to forwarding the message.

Node 300 may access (e.g., read from and/or write information to) data storage 306. Data storage 306 may be any suitable entity (e.g., a computer readable medium or memory) for storing various data. In some embodiments, data storage 306 may include location validation rules and/or policies associated with one or more subscribers. Data storage 306 may include information for determining whether subscriber location is valid or invalid. Example information usable in determining whether subscriber location is valid or invalid may include historical (e.g., prior) location information, network traffic statistics, subscriber movement patterns, a home network location, a visited network location, a network condition, a service agreement, a subscriber tier, a device type, a time of day, a requested service, a QoS requirement, and/or a QoE requirement.

Data storage 306 may include APN data. For example, the APN data may indicate mappings of APNs or other network identifiers and valid location information (e.g., MCC and/or MNCs). In some embodiments, a home network may store a whitelist of valid location information and related APNs that roaming subscribers can use to receive data services or other services. In this example, node 300 or another node may access APN data to determine whether some location information is associated with an appropriate APN. If the location information is associated with an appropriate APN in the whitelist, the location information may be determined to be valid.

In some embodiments, a home network may store a blacklist of invalid location information and/or related APNs that subscribers cannot use to receive data services or other services. In this example, node 300 or another node may access APN data to determine whether some location information is associated with an appropriate APN. If the location information or a related APN is in the blacklist, the location information may be determined to be invalid.

It will be appreciated that FIG. 3 and its related description are for illustrative purposes and that node 300 may include additional and/or different modules, components, or functionality.

Figure 4:
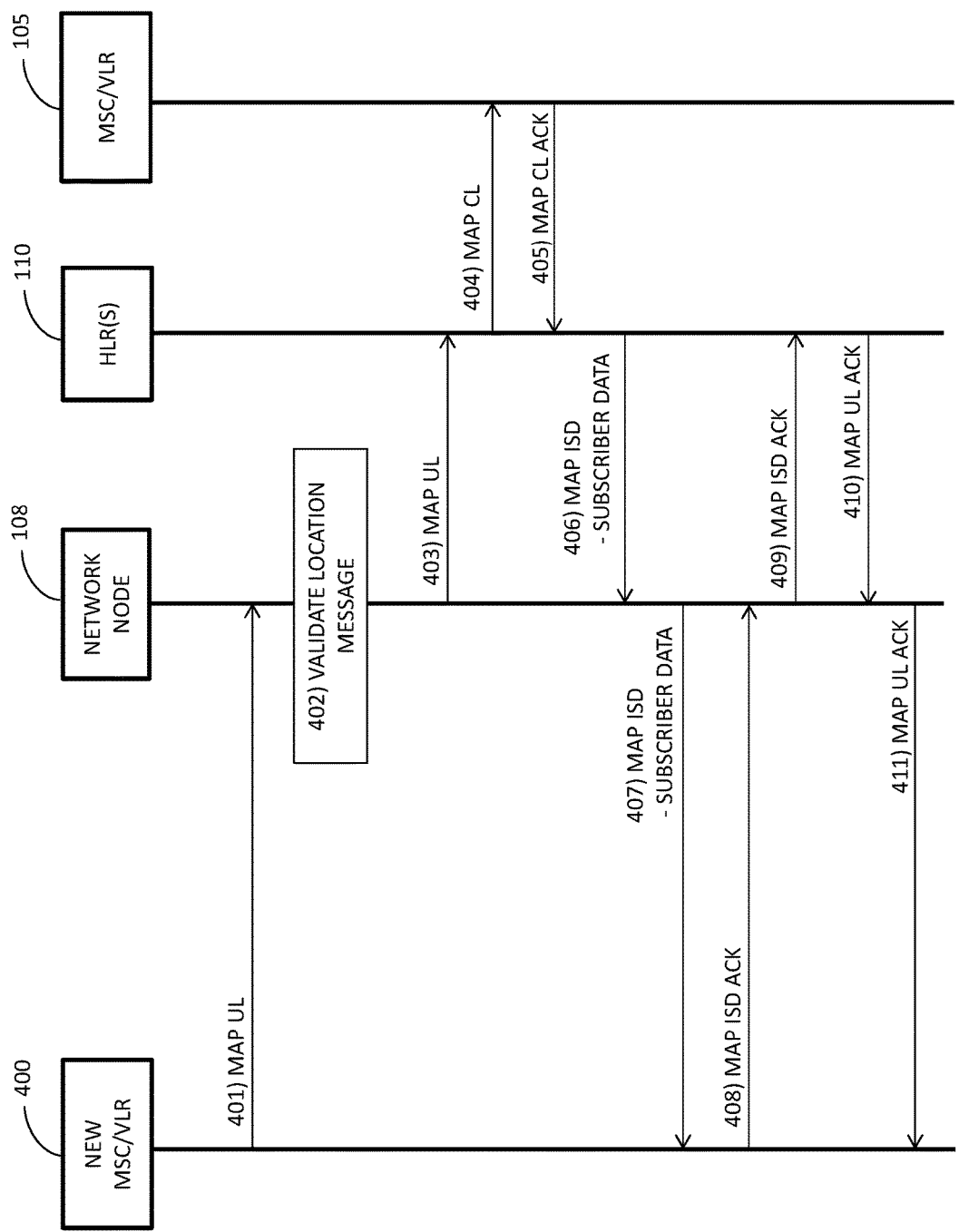
FIG. 4 is a diagram illustrating example mobile application part (MAP) messages associated with validating subscriber location information.

FIG. 4 is a diagram illustrating example MAP messages associated with validating subscriber location information. In some embodiments, subscriber location information may be provided or set by a MSC/VLR 400, which may or may not be controlled by a malicious actor and/or used for malicious activities (e.g., revenue fraud and/or call interception). In some embodiment, NN 108 may determine whether received location information is valid and may perform various actions based on this determination. In some embodiments, NN 108 may include LVE 304 and be configured to analyze signaling messages between nodes of a visited network (e.g., MSC/VLR 400) and/or nodes of a home network (e.g., HLR(s) 110).

Referring to FIG. 4, in step 401, a MAP UL message may be sent from MSC/VLR 400 to NN 108. The MAP UL message may include information for updating the current location of UE 102 and may be destined to HLR(s) 110.

In step 402, the MAP UL message may be received and validated at NN 108. For example, NN 108 may be an STP or a signaling router. In this example, NN 108 or LVE 304 therein may be configured to perform a location validation analysis (e.g., using one or more location validation algorithms) for determining whether the signaling message or location information therein is valid. Continuing with this example, if the location information is determined to be invalid (or likely to be invalid), NN 108 may discard the MAP UL message or otherwise prevent the MAP UL message from reaching HLR(s) 110.

In some embodiments, NN 108 may utilize CLS 118 for validating location information associated with a MAP UL message. For example, NN 108 may include a message copy function and/or other functionality for sending a MAP UL message, a copy thereof, or related location information to CLS 118. In this example, CLS or LVE 304 therein may be configured to perform a location validation analysis (e.g., using one or more location validation algorithms) for determining whether the signaling message or location information therein is valid. Continuing with this example, CLS 118 may notify NN 108 of its validation determination, e.g., by sending a message or updating a shared memory.

In step 403, the MAP UL message or a similar MAP UL message may be sent from NN 108 to HLR(s) 110. For example, after determining location information in a MAP UL message is valid (or likely to be valid), NN 108 may send the MAP UL message to HLR(s) 110 or otherwise allow the MAP UL message to continue onwards to HLR(s) 110. In another example, after determining location information in a MAP UL message is invalid (or likely to be invalid), NN 108 may modify location information in the MAP UL message before sending it to HLR(s) 110. In this example In step 404, a MAP cancel location (CL) message may be sent from HLR(s) 110 to MSC/VLR 105. For example, after receiving a MAP UL message indicating that a subscriber is roaming in a new network, HLR(s) 110 may send, to MSC/VLR 105, a MAP CL message for canceling registration of the subscriber in a previously registered network.

In step 405, a MAP CL acknowledgement message may be sent from MSC/VLR 105 to HLR(s) 110. The MAP CL acknowledgement message may indicate to HSS(s) 210 that the one or more MAP CL message was received by MSC/VLR 105 and/or that the subscriber is de-registered.

In some embodiments, HLR(s) 110 may receive the MAP UL message and use information in the message to retrieve subscriber data. HLR(s) 110 may then generate a MAP ISD message.

At step 406, a MAP ISD message may be sent from HLR(s) 110 to NN 108. For example, NN 108 may be an STP or a signaling router. In this example, NN 108 may be configured to route or forward the signaling message to its intended destination. The MAP ISD message may include subscriber data (e.g., a subscriber profile) and may include an APN associated with an ARP.

In step 407, the MAP ISD message or a similar MAP ISD message may be sent from NN 108 to MSC/VLR 400. For example, the sent MAP ISD message may be substantially the same as the MAP ISD message received by NN 108.

In step 408, a MAP ISD acknowledgement message may be sent from MSC/VLR 400 to NN 108. The MAP ISD acknowledgement message may indicate that the MAP ISD message was received by MSC/VLR 400.

In step 409, the MAP ISD acknowledgement message or a similar MAP ISD acknowledgement message may be sent from NN 108 to HLR(s) 110. For example, the sent MAP ISD acknowledgement message may be substantially the same as the MAP ISD acknowledgement message received by NN 108.

At step 410, a MAP UL acknowledgement message may be sent from HLR(s) 110 to NN 108. For example, NN 108 may be an STP or a signaling router. In this example, NN 108 may be configured to route or forward the signaling message to its intended destination. The MAP UL acknowledgement message may indicate that the update location procedure was successful.

In step 411, the MAP UL acknowledgement message or a similar MAP UL acknowledgement message may be sent from NN 108 to MSC/VLR 400. For example, the sent MAP UL acknowledgement message may be substantially the same as the MAP UL acknowledgement message received by NN 108.

It will be appreciated that FIG. 4 is for illustrative purposes and that different and/or additional messages and/or actions may be used. It will also be appreciated that various messages and/or actions described herein may occur in a different order or sequence. For example, step 406 may occur before and/or concurrently with step 405 or step 404.

Figure 5:
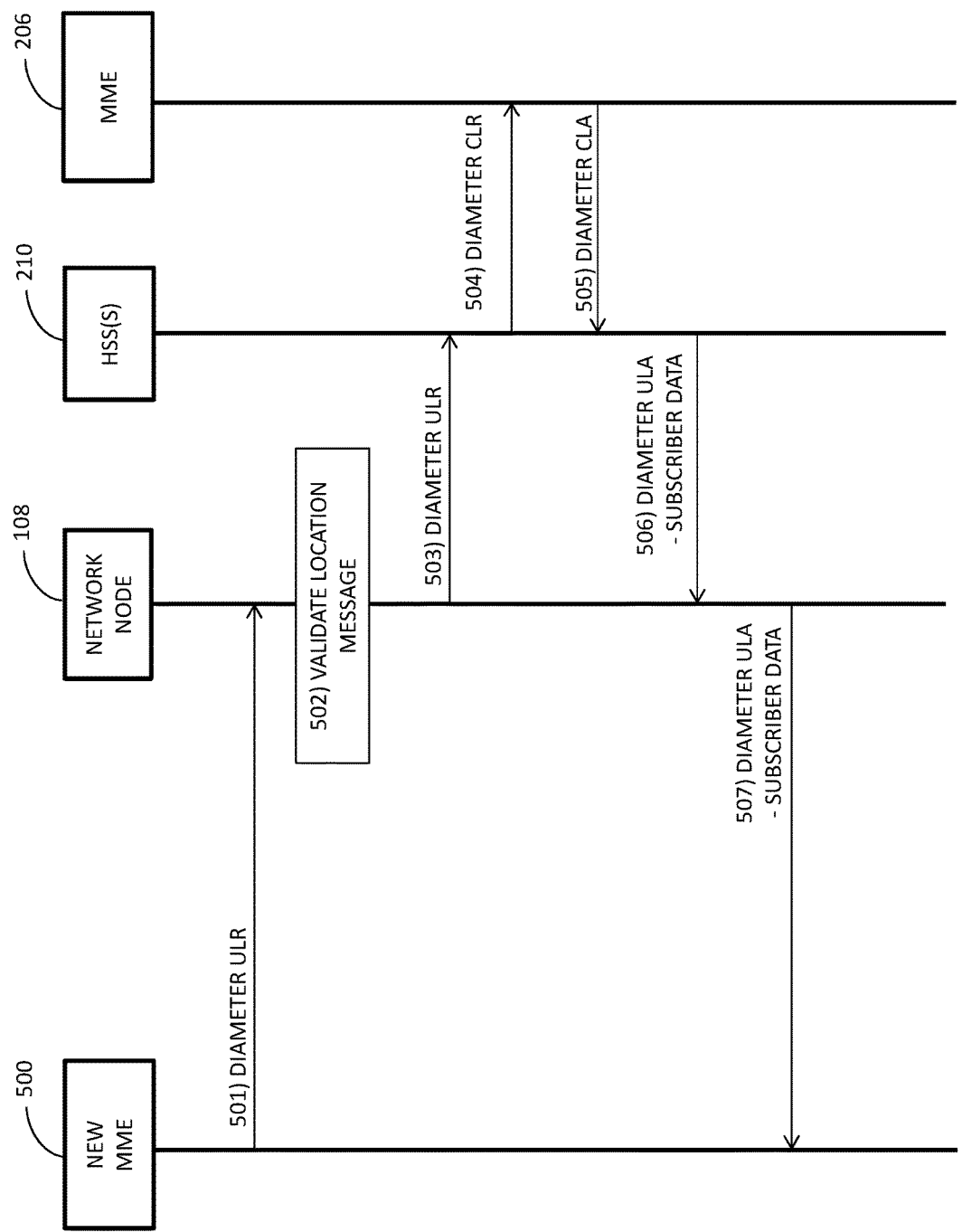
FIG. 5 is a diagram illustrating example Diameter messages associated with validating subscriber location information.

FIG. 5 is a diagram illustrating example Diameter messages associated with validating subscriber location information. In some embodiments, subscriber location information may be provided or set by a MME 500, which may or may not be controlled by a malicious actor and/or used for malicious activities (e.g., revenue fraud and/or call interception). In some embodiment, NN 108 may determine whether received location information is valid and may perform various actions based on this determination. In some embodiments, NN 108 may include LVE 304 and be configured to analyze signaling messages between nodes of a visited network (e.g., MME 500) and/or nodes of a home network (e.g., HSS(s) 210).

Referring to FIG. 5, in step 501, a Diameter ULR message may be sent from MME 500 to NN 108. The Diameter ULR message may include information for updating the current location of UE 102 and may be destined to HSS(s) 210.

In step 502, the Diameter ULR message may be received and validated at NN 108. For example, NN 108 may be a Diameter node, a DRA, or DSR. In this example, NN 108 or LVE 304 therein may be configured to perform a location validation analysis (e.g., using one or more location validation algorithms) for determining whether the signaling message or location information therein is valid. Continuing with this example, if the location information is determined to be invalid (or likely to be invalid), NN 108 may discard the Diameter ULR message or otherwise prevent the Diameter ULR message from reaching HSS(s) 210.

In some embodiments, NN 108 may utilize CLS 118 for validating location information associated with a Diameter ULR message. For example, NN 108 may include a message copy function and/or other functionality for sending a Diameter ULR message, a copy thereof, or related location information to CLS 118. In this example, CLS or LVE 304 therein may be configured to perform a location validation analysis (e.g., using one or more location validation algorithms) for determining whether the signaling message or location information therein is valid. Continuing with this example, CLS 118 may notify NN 108 of its validation determination, e.g., by sending a message or updating a shared memory.

In step 503, the Diameter ULR message or a similar Diameter ULR message may be sent from NN 108 to HSS(s) 210. For example, after determining location information in a Diameter ULR message is valid (or likely to be valid), NN 108 may send the Diameter ULR message to HSS(s) 210 or otherwise allow the Diameter ULR message to continue onwards to HSS(s) 210. In another example, after determining location information in a Diameter ULR message is invalid (or likely to be invalid), NN 108 may modify location information in the Diameter ULR message before sending it to HSS(s) 210. In this example In step 504, a Diameter Cancel-Location-Request (CLR) message may be sent from HSS(s) 210 to MME 206. For example, after receiving a Diameter ULR message indicating that a subscriber is roaming in a new network, HSS(s) 210 may send, to MME 206, a Diameter CLR message for canceling registration of the subscriber in a previously registered network.

In step 505, a Diameter Cancel-Location-Answer (CLA) message may be sent from MME 206 to HSS(s) 210. The Diameter CLA message may indicate to HSS(s) 210 that the one or more Diameter CLR message was received by MME 206 and/or that the subscriber is de-registered.

In some embodiments, HSS(s) 210 may receive the Diameter ULR message and use information in the message to retrieve subscriber data. HSS(s) 210 may then generate a Diameter ISD message.

At step 506, a Diameter Update-Location-Answer (ULA) message may be sent from HSS(s) 210 to NN 108. For example, NN 108 may be a Diameter node, a DRA, or DSR. In this example, NN 108 may be configured to route or forward the signaling message to its intended destination. The Diameter ULA message may include subscriber data (e.g., a subscriber profile) and may include an APN associated with an ARP. The Diameter ULA message may also indicate that the update location procedure was successful.

In step 507, the Diameter ULA message or a similar Diameter ULA message may be sent from NN 108 to MME 500. For example, the sent Diameter ISD message may be substantially the same as the Diameter ISD message received by NN 108.

It will be appreciated that FIG. 5 is for illustrative purposes and that different and/or additional messages and/or actions may be used. It will also be appreciated that various messages and/or actions described herein may occur in a different order or sequence. For example, step 506 may occur before and/or concurrently with step 505 or step 504.

Figure 6:
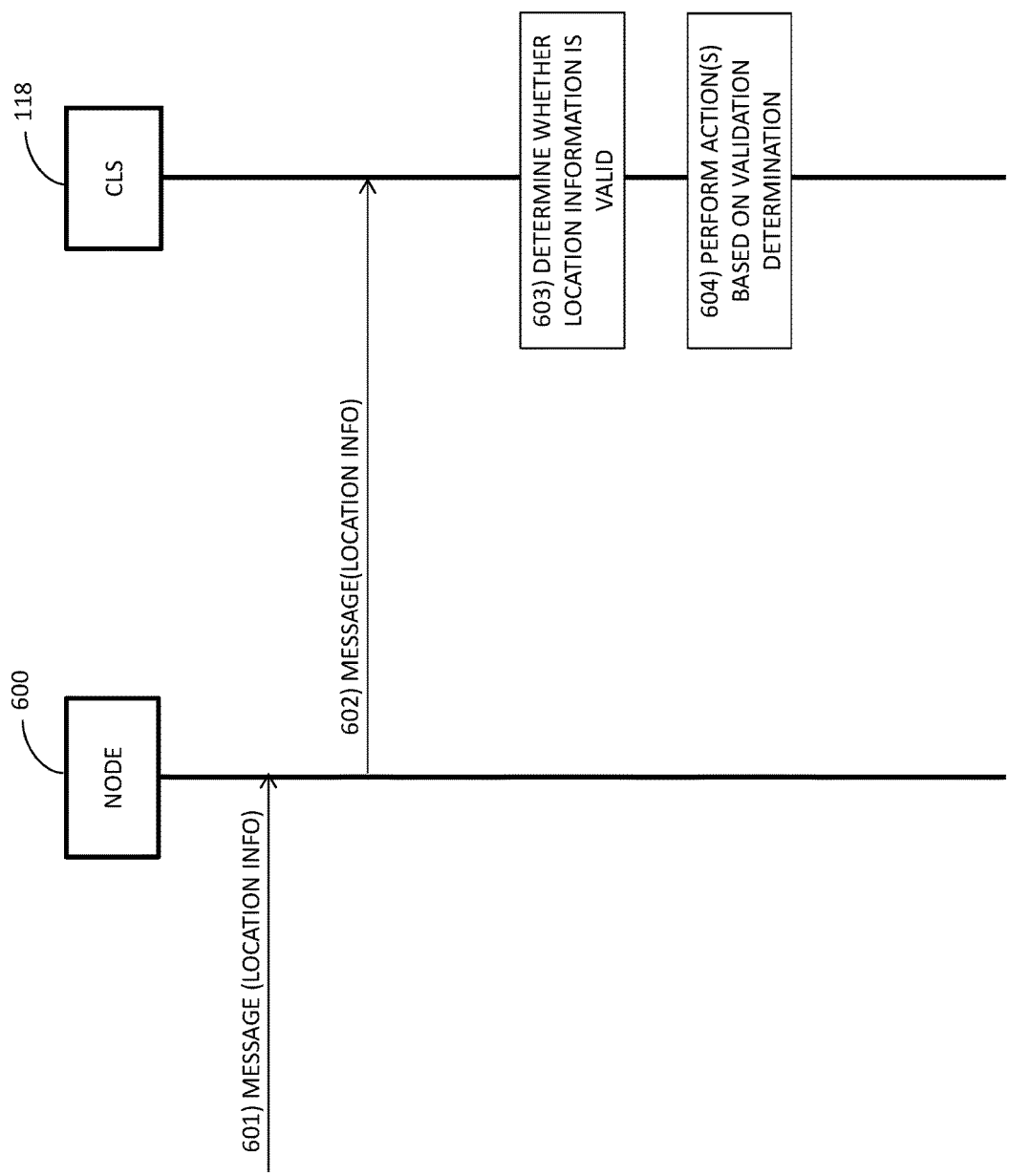
FIG. 6 is a diagram illustrating a centralized location server (CLS) validating subscriber location information.

FIG. 6 is a diagram illustrating CLS 118 validating subscriber location information. In some embodiments, node 600 may send subscriber location information to CLS 118 for location validation analysis. Node 600 may represent any suitable entity in communications environment 100 or communications environment 200, such NN 108, HLR(s) 110, MSC/VLR 105, MME 206, HSS(s) 210, etc. In some embodiments, CLS or LVE 304 therein may be configured to perform a location validation analysis (e.g., using one or more location validation algorithms) for determining whether a message or subscriber location information therein is valid.

Referring to FIG. 6, in step 601, a message containing subscriber location information may be sent from to node 600. In some embodiments, the message may be a signaling message (e.g., a Diameter ULR message or a MAP UL message) or other message (e.g., an HTTP message) containing subscriber location information, such as a TAI, a MCC, or a MNC.

In step 602, the same message or another message containing the subscriber location information may be sent from node 600 to CLS 118. For example, node 600 may receive a message from MSC/VLR 400 and may generate a location validation request message that includes location information from the message. In this example, the location validation request message may be sent to CLS 118.

In step 603, it may be determined whether the location information is valid based on a location validation algorithm. For example, CLS 118 may use a location validation algorithm that uses subscriber-specific (e.g., dynamic) rules and/or historical location information associated with a subscriber in determining with current location information is valid.

In step 604, at least one action may be performed based on the validation determination. For example, CLS 118 may generate and send a location validation response message or other message indicating whether the location information analyzed is valid or invalid. In another example, e.g., if location information appears invalid, CLS 118 may store data about the location information and/or may correlate the data with other stored data, e.g., to identify a likelihood of validity or level of threat. In another example, CLS 118 may inform a network operator or a management system about potential malicious activity.

It will be appreciated that FIG. 6 is for illustrative purposes and that different and/or additional messages and/or actions may be used. It will also be appreciated that various messages and/or actions described herein may occur in a different order or sequence.

Figure 7:
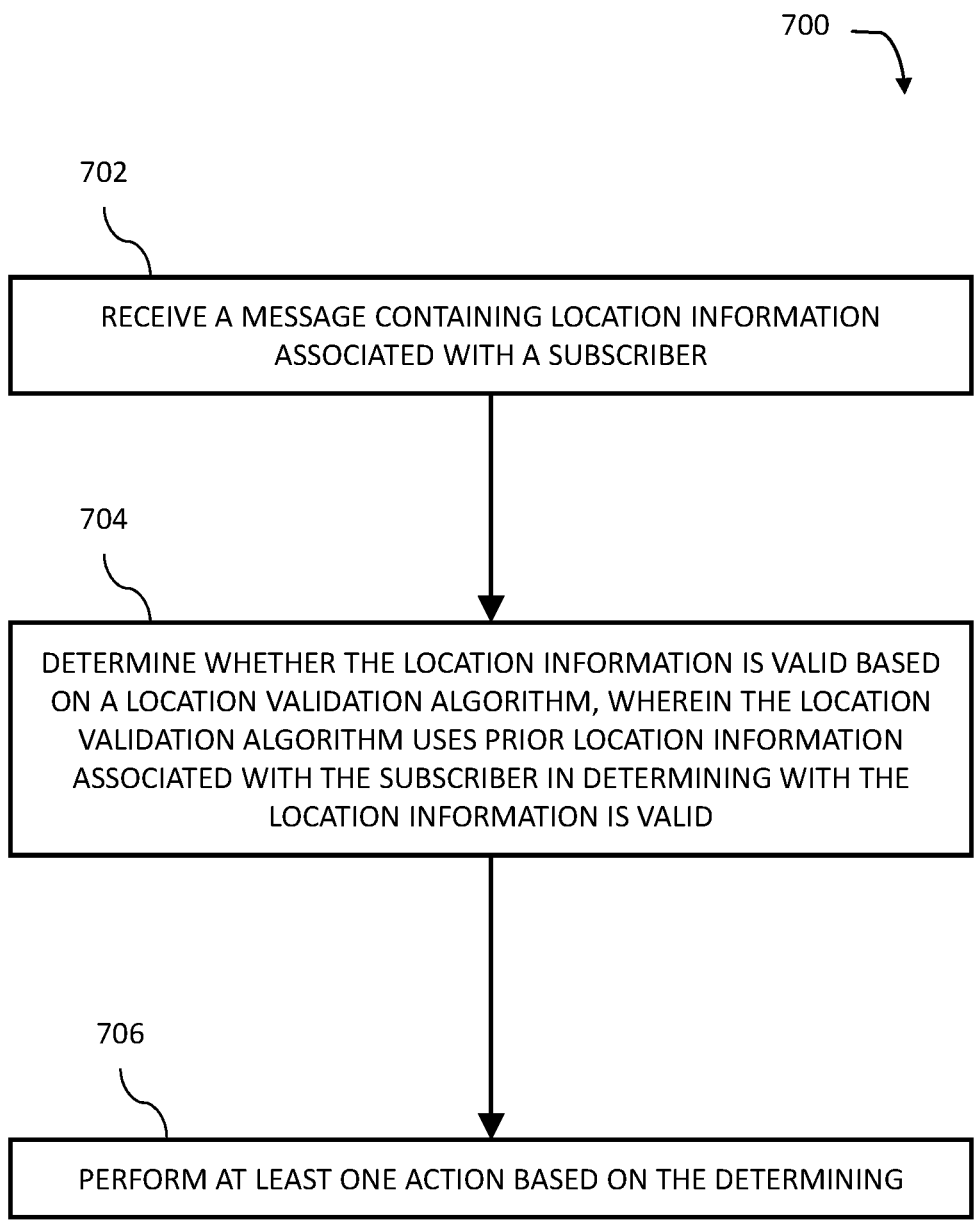
FIG. 7 is a diagram illustrating an example process for validating subscriber location information.

FIG. 7 is a diagram illustrating an example process 700 for validating subscriber location information. In some embodiments, example process 700 described herein, or portions thereof, may be performed at or performed by NN 108, node 300, LVE 304, and/or another module or node.

Referring to example process 700, in step 702, a message may be received containing location information associated with a subscriber.

In some embodiments, a message containing location information may include a Diameter message, a Diameter Update-Location-Request (ULR) message, a mobile application part (MAP) message, a MAP update location message, or a location validation request message.

In step 704, it may be determined whether the location information is valid based on a location validation algorithm. For example, a location validation algorithm may use prior location information associated with a subscriber in determining with current location information is valid.

In some embodiments, a location validation algorithm may use prior location information to identify a movement pattern associated with a subscriber, wherein the location validation algorithm determines that location information in a message may be invalid if the location information does not correspond to the movement pattern. For example, if LVE 304 or a related entity determines an established movement pattern for a subscriber that involves no international travel, LVE 304 or the related entity may determine that subscriber location in a location update message is invalid if it indicates that the subscriber has abruptly appeared in Sweden since this location information would not correspond to the established movement pattern.

In some embodiments, a location validation algorithm may use prior location information along with timing information (e.g., timestamps), wherein the location validation algorithm may determine that location information in a message is invalid if the timing information associated with the location information in the message is suspicious based on a distance between the location information in the message and a most recent prior location information and an amount of time between the timing information associated with the location information in the message and the timing information associated with the most recent prior location information. For example, if LVE 304 or a related entity determines that a subscriber was registered in Athens, Greece and then five minutes later a location update message is received for the subscriber indicating that the subscriber is in Charlotte, N.C., LVE 304 or the related entity may determine that the approximate distance between the two locations is too great to have occurred in five minutes and, as such, may determine that the subscriber location in the location update message is invalid.

In step 706, at least one action may be performed based on the determining. For example, if location information is determined to be invalid, one or more mitigating actions may be performed, e.g., to prevent or minimize malicious activities.

In some embodiments, performing at least one action based on a location validation determination may include in response to determining that location information may be valid, forwarding a message to a location register, sending a message to a node indicating that the location information may be valid, or copying or storing a portion of the message.

In some embodiments, performing at least one action based on a location validation determination may include in response to determining that location information may be invalid, discarding a message, stopping the message from reaching a location register, sending a message to a node indicating that the location information may be invalid, copying or storing a portion of the message.

In some embodiments, a location register may include a HLR or a HSS.

In some embodiments, a message containing subscriber location information may originate from an MME, a VLR, an MSC, a node in a visited network, a SGSN, or a gateway.

In some embodiments, a network node may include a Diameter node, a Diameter routing agent, a Diameter signaling router, a gateway, a signaling router, an STP, a signaling gateway (SG), a signaling system number 7 (SS7) node, a CLS, or a signaling node.

It will appreciated that while some aspects of the subject matter described herein has been discussed with reference to SS7 and Diameter based mobile networks (2G, 3G, 4G, LTE, EPC/EPS), various other networks may utilize some aspects of the subject matter described herein. For example, any network that utilize messages and/or includes a message routing node may use features, mechanisms and techniques described herein to validate (e.g., screen or filter) subscriber location information.

It should be noted that NN 108, CLS 118, node 300, and/or functionality described herein may constitute a special purpose computing device. Further, NN 108, CLS 118, node 300, and/or functionality described herein can improve the technological field of network security and/or fraud prevention. For example, by validating subscriber location information in various messages and performing one or more mitigating actions when subscriber location information is determined to be invalid or likely to be invalid, malicious activities and their negative consequences (e.g., revenue fraud) can be avoided and/or prevented.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for validating subscriber location information, the method comprising:
    at a first network node separate from user equipment:
        receiving a message containing location information associated with a subscriber, wherein the message originates from a second network node separate from the user equipment;
        determining whether the location information is valid based on a location validation algorithm, wherein the location validation algorithm uses prior location information associated with the subscriber in determining whether the location information is valid, wherein the prior location information associated with the subscriber is derived from at least one Diameter mobility management message that originates from at least one network node separate from the first network node and the user equipment, wherein the location validation algorithm uses the prior location information to identify a movement pattern associated with the subscriber, wherein the location validation algorithm determines that the location information in the message is invalid if the location information does not correspond to the movement pattern, wherein the movement pattern identifies a plurality of valid locations for the subscriber based on a sequence of locations previously visited by the subscriber; and
        performing at least one action based on the determining.

2. The method of claim 1 wherein the message includes a Diameter message, a Diameter Update-Location-Request (ULR) message, a mobile application part (MAP) message, a MAP update location message, or a location validation request message.

3. The method of claim 1 wherein the location validation algorithm uses the prior location information along with timing information, wherein the location validation algorithm determines that the location information in the message is invalid if the timing information associated with the location information in the message is suspicious based on a distance between the location information in the message and a most recent prior location information and an amount of time between the timing information associated with the location information in the message and the timing information associated with the most recent prior location information.

4. The method of claim 1 wherein performing the at least one action includes in response to determining that the location information is valid, forwarding the message to a location register, sending a message to a node indicating that the location information is valid, or copying or storing a portion of the message.

5. The method of claim 1 wherein performing the at least one action includes in response to determining that the location information is invalid, discarding the message, stopping the message from reaching a location register, sending a message to a node indicating that the location information is invalid, copying or storing a portion of the message.

6. The method of claim 5 wherein the location register includes a home location register (HLR) or a home subscriber server (HSS).

7. The method of claim 1 wherein the second network node is a mobility management element (MME), a visitor location register (VLR), a mobile switching center (MSC), a node in a visited network, a serving general packet radio service (GPRS) support node (SGSN), or a gateway.

8. The method of claim 1 wherein the first network node includes a Diameter node, a Diameter routing agent, a Diameter signaling router, a gateway, a signaling router, a signal transfer point (STP), a signaling gateway (SG), a signaling system number 7 (SS7) node, a centralized location server (CLS), or a signaling node.

9. A system for validating subscriber location information, the system comprising:
    a first network node separate from user equipment comprising:
        at least one processor; and
        a memory,
    wherein the first network node is configured for:
        receiving a message containing location information associated with a subscriber, wherein the message originates from a second network node separate from user equipment;
        determining whether the location information is valid based on a location validation algorithm, wherein the location validation algorithm uses prior location information associated with the subscriber in determining whether the location information is valid, wherein the prior location information associated with the subscriber is derived from at least one Diameter mobility management message that originates from at least one network node separate from the first network node and the user equipment, wherein the location validation algorithm uses the prior location information to identify a movement pattern associated with the subscriber, wherein the location validation algorithm determines that the location information in the message is invalid if the location information does not correspond to the movement pattern, wherein the movement pattern identifies a plurality of valid locations for the subscriber based on a sequence of locations previously visited by the subscriber; and
        performing at least one action based on the determining.

10. The system of claim 9 wherein the message includes a Diameter message, a Diameter Update-Location-Request (ULR) message, a mobile application part (MAP) message, a MAP update location message, or a location validation request message.

11. The system of claim 9 wherein the location validation algorithm uses the prior location information along with timing information, wherein the location validation algorithm determines that the location information in the message is invalid if the timing information associated with the location information in the message is suspicious based on a distance between the location information in the message and a most recent prior location information and an amount of time between the timing information associated with the location information in the message and the timing information associated with the most recent prior location information.

12. The system of claim 9 wherein the first network node is configured for:
    in response to determining that the location information is valid, forwarding the message to a location register, sending a message to a node indicating that the location information is valid, or copying or storing a portion of the message.

13. The system of claim 9 wherein the first network node is configured for:
   in response to determining that the location information is invalid, discarding the message, stopping the message from reaching a location register, sending a message to a node indicating that the location information is invalid, copying or storing a portion of the message.

14. The system of claim 13 wherein the location register includes a home location register (HLR) or a home subscriber server (HSS).

15. The system of claim 9 wherein the second network node is a mobility management element (MME), a visitor location register (VLR), a mobile switching center (MSC), a node in a visited network, a serving general packet radio service (GPRS) support node (SGSN), or a gateway.

16. The system of claim 9 wherein the first network node includes a Diameter node, a Diameter routing agent, a Diameter signaling router, a gateway, a signaling router, a signal transfer point (STP), a signaling gateway (SG), a signaling system number 7 (SS7) node, a centralized location server (CLS), or a signaling node.

17. A non-transitory computer readable medium comprising computer executable instructions embodied in the non-transitory computer readable medium that when executed by at least one processor of at least one computer cause the at least one computer to perform steps comprising:
   at a first network node separate from user equipment:
      receiving a message containing location information associated with a subscriber, wherein the message originates from a second network node separate from user equipment;
      determining whether the location information is valid based on a location validation algorithm, wherein the location validation algorithm uses prior location information associated with the subscriber in determining whether the location information is valid, wherein the prior location information associated with the subscriber is derived from at least one Diameter mobility management message that originates from at least one network node separate from the first network node and the user equipment, wherein the location validation algorithm uses the prior location information to identify a movement pattern associated with the subscriber, wherein the location validation algorithm determines that the location information in the message is invalid if the location information does not correspond to the movement pattern, wherein the movement pattern identifies a plurality of valid locations for the subscriber based on a sequence of locations previously visited by the subscriber; and
      performing at least one action based on the determining.

18. The non-transitory computer readable medium of claim 17 wherein the message includes a Diameter message, a Diameter Update-Location-Request (ULR) message, a mobile application part (MAP) message, a MAP update location message, or a location validation request message.

* * * * *

UNITED STATES PATENT AND TRADEMARK OFFICE
CERTIFICATE OF CORRECTION

Page 1 of 1

PATENT NO. : 10,470,154 B2
APPLICATION NO. : 15/376631
DATED : November 5, 2019
INVENTOR(S) : Chellamani et al.

It is certified that error appears in the above-identified patent and that said Letters Patent is hereby corrected as shown below:

On the Title Page

On page 2, Column 2, under Other Publications, Line 9, delete "Monile" and insert -- Mobile --, therefor.

On page 2, Column 2, under Other Publications, Line 54, delete ""Digitial" and insert -- "Digital --, therefor.

In the Specification

In Column 6, Line 2, delete "7a.m." and insert -- 7 a.m. --, therefor.

In Column 14, Line 39, after "110." delete "In this example".

In Column 16, Line 14, after "210." delete "In this example".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*